(12) United States Patent
Bednarchik et al.

(10) Patent No.: US 10,518,826 B2
(45) Date of Patent: Dec. 31, 2019

(54) ACTIVELY ACTUATABLE WHEELHOUSE LINER ASSEMBLY

(71) Applicant: GM GLOBAL TECHNOLOGY OPERATIONS LLC, Detroit, MI (US)

(72) Inventors: John H. Bednarchik, Royal Oak, MI (US); Suzanne M. Cody-Gump, Metamora, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 2 days.

(21) Appl. No.: 15/814,651

(22) Filed: Nov. 16, 2017

(65) Prior Publication Data

US 2019/0144053 A1    May 16, 2019

(51) Int. Cl.
*B62D 35/00* (2006.01)
*B60R 13/08* (2006.01)
(Continued)

(52) U.S. Cl.
CPC ........ *B62D 35/008* (2013.01); *B60R 13/0861* (2013.01); *B60R 19/48* (2013.01);
(Continued)

(58) Field of Classification Search
CPC .... B62D 25/163; B62D 25/16; B62D 25/161; B62D 25/088; B62D 25/168;
(Continued)

(56) References Cited

U.S. PATENT DOCUMENTS 6,539,295 B1 * 3/2003 Katzen .................. B60C 23/064
701/33.6
8,469,442 B1 * 6/2013 Pencak .................. B62D 25/14
296/187.12
(Continued)

FOREIGN PATENT DOCUMENTS

DE    102007051496 A1    4/2009
DE    102014100190 A1    7/2014
DE    102017000819 A1    7/2017

OTHER PUBLICATIONS

German Office Action for application No. 10 2018 128 588.4 dated Jul. 7, 2019, 6 pages.

*Primary Examiner* — D Glenn Dayoan
*Assistant Examiner* — Sunsurraye Westbrook

(57) ABSTRACT

An automotive vehicle includes a body with a front portion, an underbody portion, a wheelhouse disposed in the underbody portion, and a front fascia disposed at the front portion. The wheelhouse is provided with a liner. A movable member is disposed between the wheelhouse liner and the front fascia. The movable member has a venting position and a barrier position. In the barrier position the front fascia, movable member, and wheelhouse liner define a generally contiguous surface, and in the venting position the movable member is displaced at least partly away from the body relative to the barrier position. An actuator is coupled to the movable member and configured to actuate the movable member between the venting position and the barrier position. A controller is configured to control the actuator to (Continued)

move the movable member to the barrier position in response to a first operating condition being satisfied.

19 Claims, 3 Drawing Sheets

(51) Int. Cl.
    *B60R 19/48*     (2006.01)
    *B62D 25/16*     (2006.01)
    *B60W 40/06*     (2012.01)
    *B60R 19/00*     (2006.01)

(52) U.S. Cl.
    CPC ........ *B62D 25/16* (2013.01); *B60R 2019/002* (2013.01); *B60W 40/06* (2013.01)

(58) Field of Classification Search
CPC ...... B62D 25/082; B62D 25/18; B62D 25/02; B62D 25/04; B60R 2021/343; B60R 21/34; B60R 13/0861; B60R 19/24; B60R 13/08; B60R 13/0838; B60R 13/0853; B60R 19/34; B60R 19/52
USPC .... 296/198, 193.09, 203.02, 187.12, 190.01, 296/29, 77.1, 63, 210, 209; 280/154, 280/291, 851, 163, 219, 281.1, 760, 854, 280/849, 847
See application file for complete search history.

(56) References Cited

U.S. PATENT DOCUMENTS

| | | | | |
|---|---|---|---|---|
| 9,193,407 | B2* | 11/2015 | Muth | B62J 99/00 |
| 2007/0057536 | A1* | 3/2007 | Longchamp | B62D 25/168 |
| | | | | 296/198 |
| 2013/0096781 | A1* | 4/2013 | Reichenbach | B60Q 1/326 |
| | | | | 701/49 |
| 2015/0284032 | A1* | 10/2015 | Hanson | B62D 25/182 |
| | | | | 180/89.17 |
| 2016/0288747 | A1* | 10/2016 | Jensen | B60R 19/00 |

* cited by examiner

ACTIVELY ACTUATABLE WHEELHOUSE LINER ASSEMBLY

TECHNICAL FIELD

The present disclosure relates to automotive vehicles, and more particularly to actively-controllable aerodynamic devices for automotive vehicles.

INTRODUCTION

The wheels of a vehicle each are generally located in a wheelhouse of the vehicle. In a normal driving operation, the rotation of the wheels may discharge debris such as rocks, dirt, snow, water, or the like, that may be projected against the wheelhouse shell. To protect against this, the vehicle may employ a wheelhouse liner at each wheel house location. In addition to serving as a barrier against projectiles caused by the rotating wheels, the wheelhouse liner may serve additional functions, including acoustical and aesthetical. Furthermore, the wheelhouse liner may block some of the more unsightly components and/or structure of the vehicle from being seen from the exterior of the vehicle.

SUMMARY

An automotive vehicle according to the present disclosure includes a body having a front portion and an underbody portion. The vehicle includes a wheelhouse disposed in the underbody portion and a front fascia disposed at the front portion. The wheelhouse is provided with a liner. The vehicle also includes a movable member disposed between the wheelhouse liner and the front fascia. The movable member has a venting position and a barrier position. In the barrier position the front fascia, movable member, and wheelhouse liner define a generally contiguous surface, and in the venting position the movable member is displaced at least partly away from the body relative to the barrier position. The vehicle additionally includes an actuator coupled to the movable member and configured to actuate the movable member between the venting position and the barrier position. The vehicle further includes a controller configured to control the actuator to move the movable member to the barrier position in response to a first operating condition being satisfied.

In an exemplary embodiment, the first operating condition corresponds to a detected ambient humidity exceeding a predefined threshold.

In an exemplary embodiment, the first operating condition corresponds to vehicle windshield wipers being activated.

In an exemplary embodiment, the first operating condition corresponds to a collision being anticipated.

In an exemplary embodiment, the controller is further configured to move the movable member to the venting position in response to vehicle speed exceeding a predefined threshold with the first condition not being satisfied.

A method of controlling an automotive vehicle according to the present disclosure includes providing a movable panel at a location between a wheelhouse liner and a front fascia assembly. The movable member has a venting position and a barrier position. In the barrier position the front fascia assembly, movable panel, and wheelhouse liner define a generally contiguous surface. In the venting position the movable panel is displaced at least partly away from the body relative to the barrier position to define an aperture. The method additionally includes providing an actuator operably coupled to the movable panel to move the movable panel between the barrier position and the venting position. The method also includes providing a controller in communication with the actuator. The method further includes, in response to satisfaction of an operating condition, automatically controlling the actuator, via the controller, to move the movable panel from the venting position to the barrier position.

In an exemplary embodiment, the method additionally includes providing a sensor in communication with the controller. The sensor is configured to detect an ambient humidity, and the operating condition corresponds to a detected ambient humidity exceeding a predefined threshold.

In an exemplary embodiment, the method additionally includes providing a sensor in communication with the controller. The sensor is configured to detect an operator activation of a windshield wiper, and the operating condition corresponds to the windshield wiper being activated.

In an exemplary embodiment, the method additionally includes providing a sensor in communication with the controller. The sensor is configured to detect an anticipated collision, and the first operating condition corresponds to an anticipated collision being detected.

An aerodynamic control assembly for a vehicle according to the present disclosure includes a movable panel disposed between a wheelhouse liner and a front fascia assembly. The movable member has a venting position and a barrier position. In the barrier position the wheelhouse liner inhibits debris passing between the wheelhouse liner and the front fascia assembly, and in the venting position the movable panel is displaced at least partly away from the body relative to the barrier position to define an aperture. The assembly additionally includes an actuator operably coupled to the movable panel to move the movable panel between the barrier position and the venting position. The assembly also includes a first sensor configured to detect a first operating condition. The assembly further includes a controller in communication with the actuator and the first sensor. The controller is configured to, in response to the first operating condition being detected, automatically control the actuator to move the movable panel from the venting position to the barrier position.

In an exemplary embodiment, the first sensor is configured to detect ambient humidity, and the first operating condition corresponds to a detected ambient humidity exceeding a predefined threshold.

In an exemplary embodiment, the first sensor is configured to detect an operator activation of vehicle windshield wipers, and the first operating condition corresponds to vehicle windshield wipers being activated.

In an exemplary embodiment, the first sensor is configured to detect an anticipated collision, and the first operating condition corresponds to a collision being anticipated.

In an exemplary embodiment, the assembly additionally includes a second sensor configured to detect a second operating condition, and the controller is in communication with the second sensor and further configured to automatically control the actuator to move the movable panel from the venting position to the barrier position in response to the second operating condition being satisfied.

In an exemplary embodiment, the controller is further configured to move the movable panel to the venting position in response to vehicle speed exceeding a predefined threshold with the first condition not being satisfied.

Embodiments according to the present disclosure provide a number of advantages. For example, systems and methods according to the present disclosure may protect vehicle components from water and debris, while also increasing aerodynamic performance and thereby reducing energy consumption.

The above and other advantages and features of the present disclosure will be apparent from the following detailed description of the preferred embodiments when taken in connection with the accompanying drawings.

DETAILED DESCRIPTION

Figure 1:
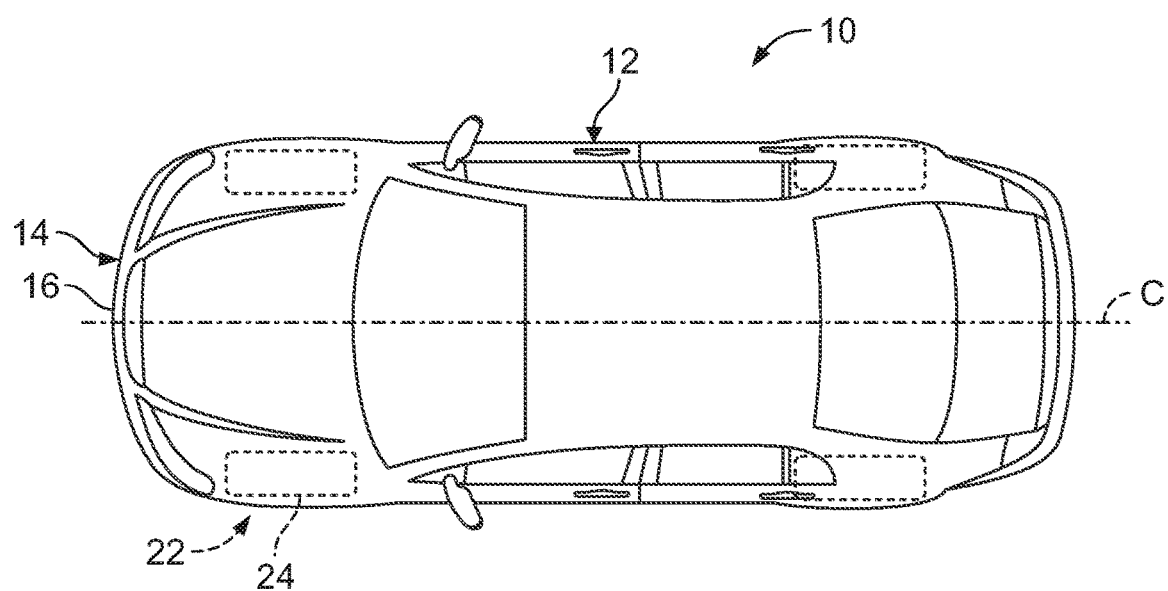
FIG. 1 is an illustration of a vehicle according to an embodiment of the present disclosure.
Figure 2:
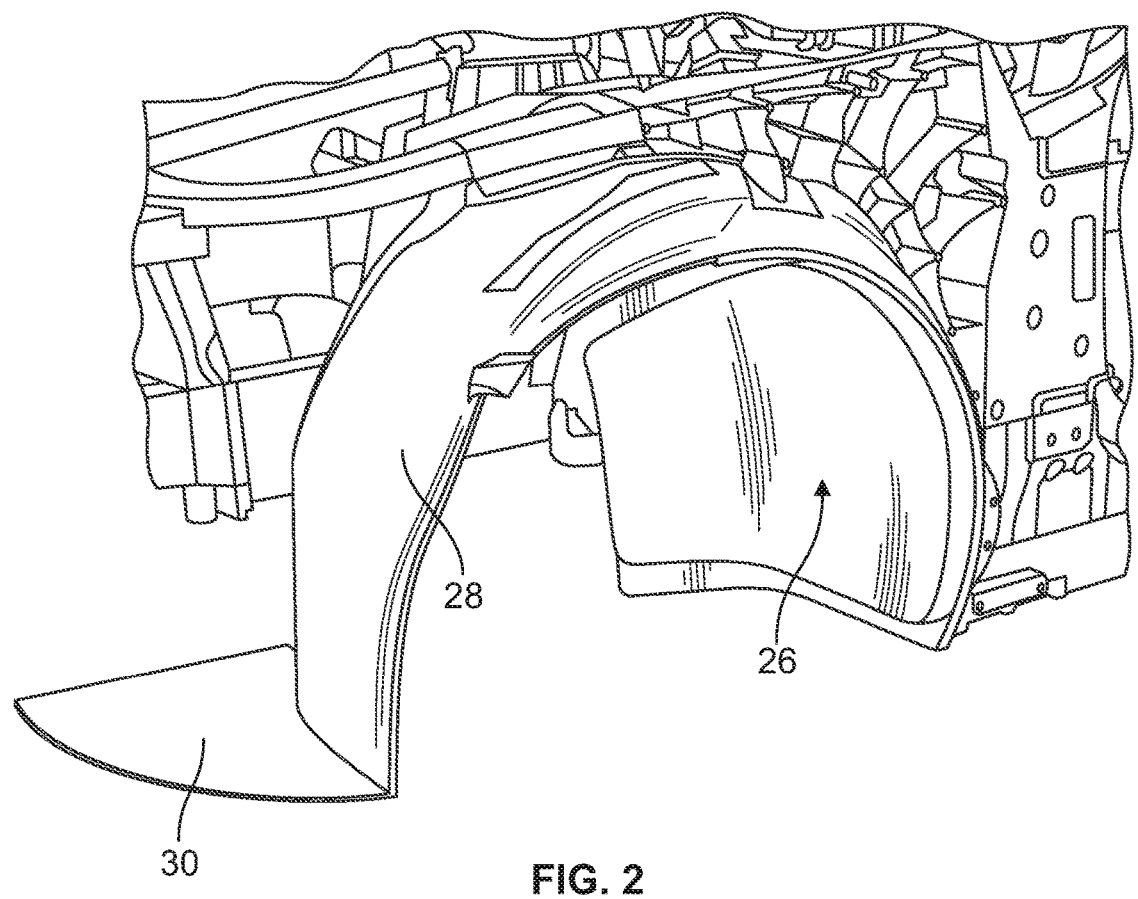
FIG. 2 is a partial isometric representation of a wheelhouse liner assembly according to an embodiment of the present disclosure.
Figure 3:
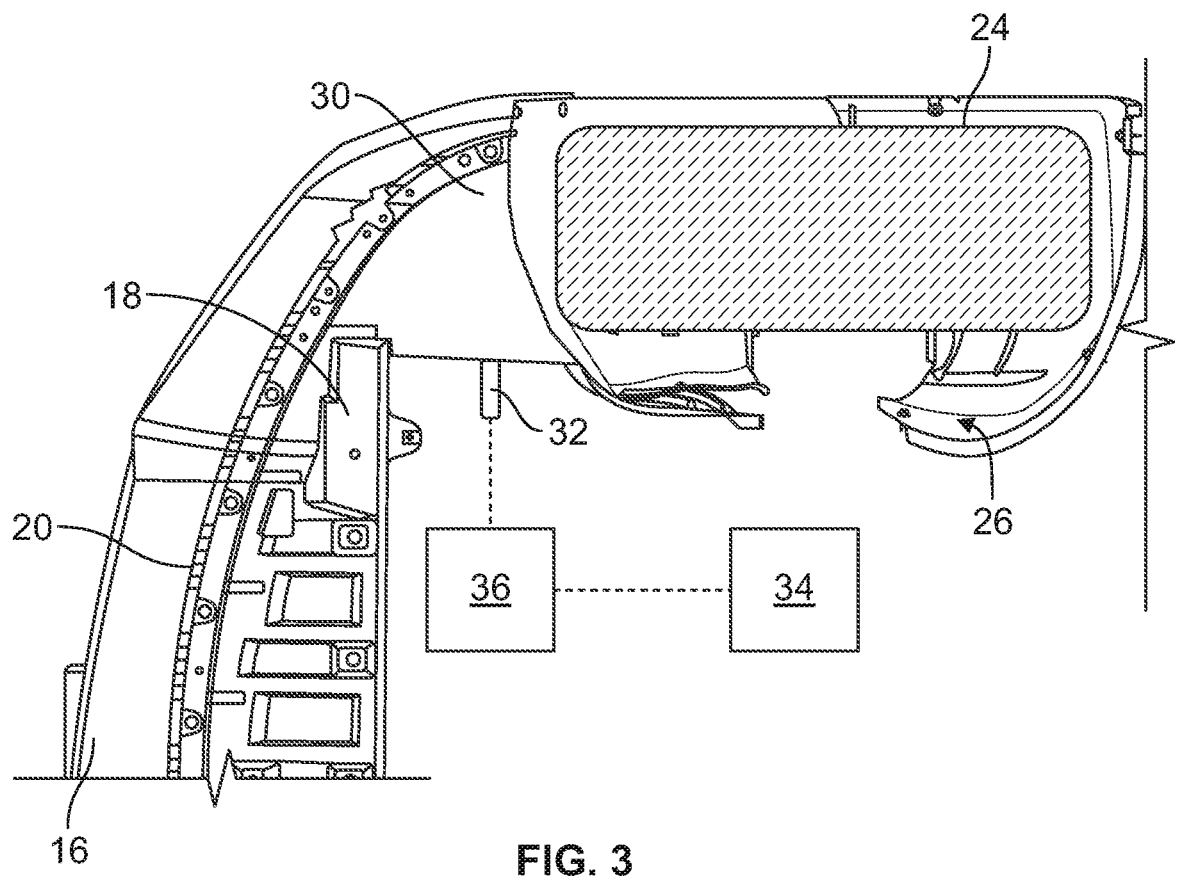
FIG. 3 is a partial schematic representation of a vehicle according to a embodiment of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring now to FIGS. 1, 2, 3, and 4, a vehicle 10 has a longitudinal center axis C. As used herein, the term "outboard" refers to a position of a component further from the center of the vehicle 10 than an inboard position. A component is laterally-outboard relative to another component if it is further laterally from the longitudinal center axis C. As used herein, the term "fore" refers to a position of a component nearer a front end of the vehicle 10, and the term "aft" refers to a position of a component nearer a rear end of the vehicle 10.

The vehicle includes a body 12 having a front end 14 having a front fascia 16. The front fascia 16 extends from the front end 14 to an underbody portion 18. In the exemplary embodiment illustrated in FIGS. 1 through 4, an air dam 20 is provided at the underbody portion 18. The air dam 20 extends from the underbody portion 18 into a path of airflow between the underbody portion 18 and a road surface. The air dam 20 may thereby air be employed to control flow of air relative to the vehicle 10 at speed to enhance vehicle dynamics and handling as well as improve drag coefficient of the vehicle body, or generate down-force thereon.

The body 10 is provided with a plurality of wheel-wells or wheelhouses 22, each with at least one road wheel 24 disposed therein. Each wheelhouse 22 is provided with a wheelhouse liner 26 to protect vehicle components from debris such as rocks, dirt, snow, water, or the like, that may be ejected by the vehicle wheels 24.

The wheelhouse liner 26 includes a wheelhouse portion 28, which is generally annular in shape and secured within the wheelhouse 22, and a fore portion 30, which may be referred to as a "duckbill". The fore portion 30 extends generally laterally, i.e. generally parallel to a road surface, foreword of the wheelhouse portion 28. In an exemplary embodiment, the fore portion 30 is a generally rigid component configured to abut or couple to the underbody portion 18 to protect components disposed above the fore portion 30.

Figure 4:
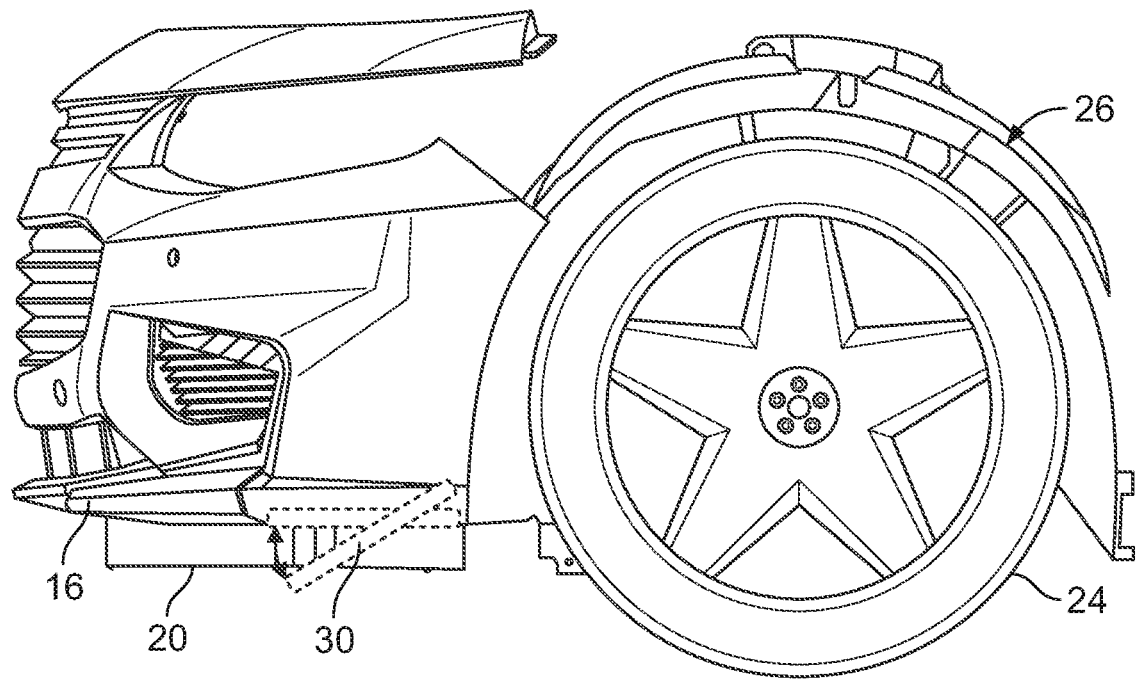
FIG. 4 is a partial side representation of a vehicle according to an embodiment of the present disclosure.

In known configurations, the fore portion 30 fixedly couples the front fascia 16 to the wheelhouse portion 28. In embodiments according to the present disclosure, however, the fore portion 30 is a movable member. As illustrated in FIG. 4, the fore portion 30, hereinafter referred to as a moveable member 30, has a first position, which may be referred to as a barrier position, and a second position, which may be referred to as a venting position. An actuator 32 is operably coupled to the movable member 30 and configured to actuate the movable member 30 between the venting position and the barrier position.

In the barrier position, the movable member 30 extends from the underbody portion 18 of the front fascia 16 to the wheelhouse portion 28 to form a generally contiguous protective surface. This position may be generally similar to known arrangements for fore portions of wheelhouse liners.

In the venting position, the movable member 30 is pivoted or otherwise deflected relative to the underbody portion 18 to thereby form a vent to draw air upward from below the underbody portion. In the illustrated embodiment, a fore edge of the movable member 30 is pivoted downward away from the underbody portion 18. Such embodiments may advantageously reduce pressure aft of the air dam 20, thereby improving drag characteristics of the vehicle 10. However, in alternative embodiments, the venting position may be defined by pivoting or translating the movable member 30 in other ways to define a vent for drawing air from the underbody portion.

The vehicle 10 additionally includes one or more sensors 34. In an exemplary embodiment, the sensor(s) 34 include a precipitation sensor, a humidity sensor, or other sensor configured to detect weather conditions indicative of a potential for water on road surfaces. The sensor(s) 34 may also include a sensor configured to detect an operator request for activation of windshield wipers, such as a position sensor associated with a control stick or other control interface. The sensor(s) 34 may also include a wheel speed sensor or other sensor configured to detect a current speed of the vehicle 10. The sensor(s) 34 may also include a positioning sensor such as a GPS receiver. The sensor(s) 34 may also include LiDAR, ultrasonic, or other sensor types configured to detect obstacles proximate the vehicle 10. The sensor(s) 34 may also include other types of sensors as appropriate, or any combination of the above.

The actuator 32 and sensor(s) 34 are in communication with or under the control of a controller 36. The controller 36 is configured to control the actuator 32 in response to signals from the sensor(s) 34, as will be discussed below with respect to FIG. 5. While depicted as a single unit, the controller 36 may include one or more additional controllers collectively referred to as a "controller." The controller 36 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

Figure 5:
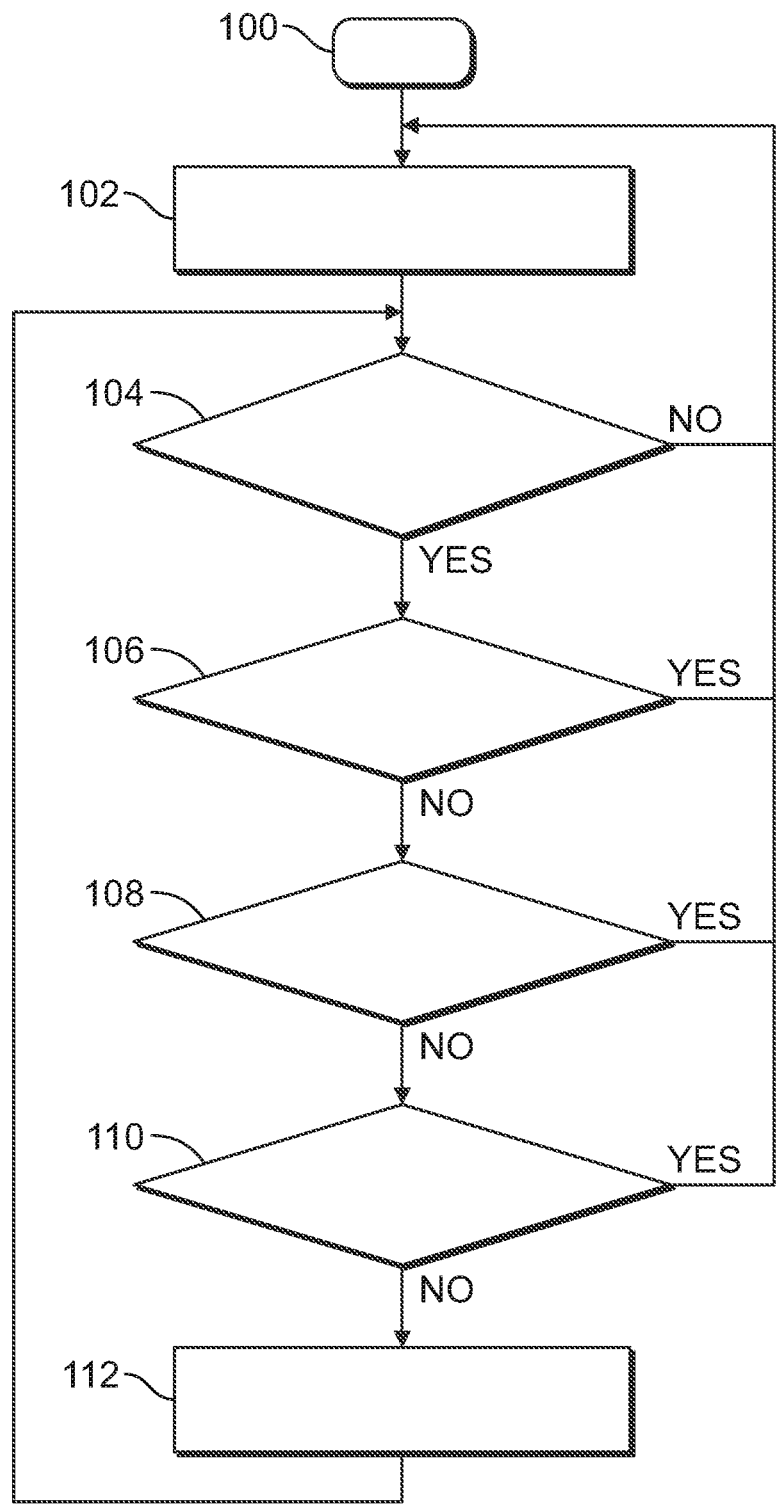
FIG. 5 is a flowchart representation of a method for controlling a vehicle according to the present disclosure.

Referring now to FIG. 5, an algorithm for controlling a vehicle according to an embodiment of the present disclosure is illustrated in flowchart form. In an exemplary embodiment, the algorithm is performed by a controller arranged similarly to the controller 36 illustrated in FIG. 3. The algorithm begins at block 100, e.g. at the initiation of a drive cycle or in response to an operator activation of an economy driving mode via an HMI.

The movable member is controlled to the barrier position at the outset, as illustrated at block 102.

A determination is made of whether a current vehicle speed exceeds a predefined threshold, as illustrated at operation 104. In an exemplary embodiment, this determination is based on a speed signal received from a wheel speed sensor, e.g. the sensor 34 illustrated in FIG. 3. In an exemplary embodiment, the predefined threshold corresponds to highway speed, e.g. approximately 50 MPH. However, in other embodiments contemplated within the scope of the present disclosure, other thresholds may be used.

If the determination of operation 104 is negative, i.e. the current vehicle speed does not exceed the threshold, then control returns to block 102. The movable member is thereby maintained in the barrier position unless and until vehicle speed exceeds the threshold.

If the determination of operation 104 is positive, then a determination is made of whether a weather condition is satisfied, as illustrated at operation 106. The weather condition corresponds to a high likelihood of water being present on road surfaces. In an exemplary embodiment, the determination is based on a signal received from a precipitation sensor or humidity sensor, e.g. the sensor 34 illustrated in FIG. 3. In such embodiments, the weather condition is satisfied in response to humidity exceeding a predefined threshold, or in response to precipitation being detected. In another exemplary embodiment, the determination is based on a signal from a sensor configured to detect an operator request for activation of windshield wipers, such as a position sensor associated with a control stick or other control interface. In such an embodiment, the weather condition is satisfied in response to an operator requesting that windshield wipers be activated. In another exemplary embodiment, the determination is based on weather forecast information, e.g. received from an external weather data source via a wireless communication interface such as a cellular data modem. In such an embodiment the weather condition is satisfied in response to the weather forecast information indicating recent, current, or imminent precipitation. In other embodiments, the determination is based on other factors, or any combination of the above.

If the determination of operation 106 is positive, i.e. the weather condition is satisfied, then control returns to block 102. The movable member is thereby maintained in the barrier condition when water on the road is likely present, protecting components located above the movable member from splashing.

If the determination of operation 106 is negative, then a determination is made of whether a debris condition is satisfied, as illustrated at operation 108. The debris condition corresponds to a high likelihood of debris being present on road surfaces. In an exemplary embodiment, the determination is based on a signal received from a positioning sensor, e.g. the sensor 34 illustrated in FIG. 3. In such embodiments, the debris condition may be satisfied in response to a current vehicle location corresponding to a gravel road or other location with similarly high likelihood of debris. In another exemplary embodiment, the determination is based on road condition information, e.g. received from an external road data source via a wireless communication interface such as a cellular data modem. In such an embodiment the debris condition is satisfied in response to the road condition data indicating debris proximate the vehicle. In other embodiments, the determination is based on other factors, or any combination of the above.

If the determination of operation 108 is positive, i.e. the debris condition is satisfied, then control returns to block 102. The movable member is thereby maintained in the barrier condition when debris on the road is likely present, protecting components located above the movable member from debris.

If the determination of operation 108 is negative, then a determination is made of whether a collision condition is satisfied, as illustrated at operation 110. The collision condition corresponds to a high likelihood of an impending collision between the vehicle and an external object. In an exemplary embodiment, the determination is based on a signal received from a LiDAR, ultrasonic, or other sensor configured to detect obstacles proximate the vehicle, e.g. the sensor 34 illustrated in FIG. 3. In such embodiments, the collision condition may be satisfied in response to a detected object proximate the vehicle with a high probability of intersection between the path of the host vehicle and the path of the object. In other embodiments, the determination is based on other factors, or any combination of the above.

If the determination of operation 110 is positive, i.e. the collision condition is satisfied, then control returns to block 102. The movable member is thereby maintained in the barrier condition when a collision is likely to occur, thereby providing a more desirable load path for dissipation of force from a collision.

If the determination of operation 110 is negative, then the movable member is controlled to the venting position, as illustrated at block 112. This may be performed by commanding an actuator, e.g. arranged similarly to the actuator 32 illustrated in FIG. 3, to move the movable member to the venting position.

Control then returns to operation 104. The movable member may thereby be maintained in the venting condition unless and until vehicle speed falls below the threshold or the weather, debris, or collision conditions are satisfied. The system may thereby increase aerodynamic performance when the movable member is not required to be in the blocking position.

As may be seen, embodiments according to the present disclosure provides a system and method for protecting vehicle components from water and debris, while also increasing aerodynamic performance and thereby reducing energy consumption.

As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a body having a front portion and an underbody portion;
a wheelhouse disposed in the underbody portion, the wheelhouse having a liner;
a front fascia disposed at the front portion;
a movable member disposed between the wheelhouse liner and the front fascia, the movable member having a venting position and a barrier position, wherein in the barrier position the front fascia, movable member, and wheelhouse liner define a generally contiguous surface, and wherein in the venting position the movable member is displaced at least partly away from the body relative to the barrier position to define an aperture;
an actuator coupled to the movable member and configured to actuate the movable member between the venting position and the barrier position; and
a controller configured to control the actuator to move the movable member to the barrier position in response to a first operating condition being satisfied.

2. The automotive vehicle of claim 1, wherein the first operating condition comprises a detected ambient humidity exceeding a predefined threshold.

3. The automotive vehicle of claim 1, wherein the first operating condition comprises vehicle windshield wipers being activated.

4. The automotive vehicle of claim 1, wherein the first operating condition comprises a collision being anticipated.

5. The automotive vehicle of claim 1, wherein the controller is further configured to move the movable member to the venting position in response to vehicle speed exceeding a predefined threshold with the first condition not being satisfied.

6. A method of controlling an automotive vehicle comprising:
providing a movable panel at a location between a wheelhouse liner and a front fascia assembly, the movable member having a venting position and a barrier position, wherein in the barrier position the front fascia assembly, movable panel, and wheelhouse liner define a generally contiguous surface, and wherein in the venting position the movable panel is displaced at least partly away from the body relative to the barrier position to define an aperture;
providing an actuator operably coupled to the movable panel to move the movable panel between the barrier position and the venting position;
providing a controller in communication with the actuator; and
in response to satisfaction of an operating condition, automatically controlling the actuator, via the controller, to move the movable panel from the venting position to the barrier position.

7. The method of claim 6, further comprising providing a sensor in communication with the controller, the sensor being configured to detect an ambient humidity, wherein the operating condition comprises a detected ambient humidity exceeding a predefined threshold.

8. The method of claim 6, further comprising providing a sensor in communication with the controller, the sensor being configured to detect an operator activation of a windshield wiper, wherein the operating condition comprises the windshield wiper being activated.

9. The method of claim 6, further comprising providing a sensor in communication with the controller, the sensor being configured to detect an anticipated collision, wherein the first operating condition comprises an anticipated collision being detected.

10. An aerodynamic control assembly for a vehicle comprising:
a movable panel disposed between a wheelhouse liner and a front fascia assembly, the movable member having a venting position and a barrier position, wherein in the barrier position the front fascia assembly, movable panel, and wheelhouse liner define a generally contiguous surface, and wherein in the venting position the movable panel is displaced at least partly away from the body relative to the barrier position to define an aperture;
an actuator operably coupled to the movable panel to move the movable panel between the barrier position and the venting position;
a first sensor configured to detect a first operating condition; and
a controller in communication with the actuator and the first sensor, the controller being configured to, in response to the first operating condition being detected, automatically control the actuator to move the movable panel from the venting position to the barrier position.

11. The aerodynamic control assembly of claim 10, wherein the first sensor is configured to detect ambient humidity, and wherein the first operating condition comprises a detected ambient humidity exceeding a predefined threshold.

12. The aerodynamic control assembly of claim 10, wherein the first sensor is configured to detect an operator activation of vehicle windshield wipers, and wherein the first operating condition comprises vehicle windshield wipers being activated.

13. The aerodynamic control assembly of claim 10, wherein the first sensor is configured to detect an anticipated collision, and wherein the first operating condition comprises a collision being anticipated.

14. The aerodynamic control assembly of claim 10, further comprising a second sensor configured to detect a second operating condition, wherein the controller is in communication with the second sensor, and wherein the controller is further configured to automatically control the actuator to move the movable panel from the venting position to the barrier position in response to the second operating condition being satisfied.

15. The aerodynamic control assembly of claim 10, wherein the controller is further configured to move the movable panel to the venting position in response to vehicle speed exceeding a predefined threshold with the first condition not being satisfied.

16. The automotive vehicle of claim 1, wherein in the movable member has a generally planar body, and wherein in the barrier position the generally planar body extends generally parallel to a ground plane.

17. The automotive vehicle of claim 1, further comprising a road wheel disposed in the wheelhouse, the road wheel having an outboard surface defining an outboard plane and an inboard surface defining an inboard plane, wherein a portion of the movable member is disposed between the outboard plane and the inboard plane.

18. The method of claim 6, wherein in the movable member has a generally planar body, and wherein in the barrier position the generally planar body extends generally parallel to a ground plane.

19. The aerodynamic control assembly of claim 10, wherein in the movable member has a generally planar body, and wherein in the barrier position the generally planar body extends generally parallel to a ground plane.

* * * * *